(12) United States Patent
Takeuchi et al.

(10) Patent No.: US 6,295,403 B1
(45) Date of Patent: *Sep. 25, 2001

(54) OPTICAL WAVEGUIDE PLATE FOR DISPLAY

(75) Inventors: Yukihisa Takeuchi, Aichi; Tsutomu Nanataki, Toyoake, both of (JP)

(73) Assignee: NGK Insulators, Ltd., Nagoya (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/046,397

(22) Filed: Mar. 23, 1998

(30) Foreign Application Priority Data

May 7, 1997 (JP) .................................................. 9-117186

(51) Int. Cl.[7] ................................. G02B 6/10; G09G 3/34
(52) U.S. Cl. .......................... 385/129; 385/128; 385/901
(58) Field of Search .............................. 385/31, 128, 129, 385/147, 146, 901

(56) References Cited

U.S. PATENT DOCUMENTS

| | | | |
|---|---|---|---|
| 2,565,514 | 8/1951 | Pajes | 99/357 |
| 2,997,922 | 8/1961 | Kaprelian | 359/222 |
| 3,376,092 | 4/1968 | Kushner et al. | 359/222 |
| 3,698,793 | 10/1972 | Tellerman | 359/290 |
| 4,113,360 | 9/1978 | Baur et al. | 345/84 |
| 4,902,086 | * 2/1990 | Henry et al. | 385/130 |
| 5,037,168 | * 8/1991 | Young et al. | 385/130 |
| 5,319,491 | 6/1994 | Selbrede | 359/291 |
| 5,636,072 | 6/1997 | Shibata et al. | 359/896 |
| 5,638,479 | * 6/1997 | Takami et al. | 385/124 |
| 5,771,321 | 6/1998 | Stern | 385/31 |
| 5,892,561 | * 4/1999 | Suzuki et al. | 349/122 |
| 5,953,469 | 9/1999 | Zhou | 385/22 |
| 6,108,479 | * 8/2000 | Takeuchi et al. | 385/129 |

FOREIGN PATENT DOCUMENTS

| | | |
|---|---|---|
| 0 675 477 | 10/1995 | (EP) . |
| 4-191704 | 7/1992 | (JP) . |
| 7-287176 | 10/1995 | (JP) . |

* cited by examiner

Primary Examiner—John D. Lee
Assistant Examiner—Sarah N. Song
(74) Attorney, Agent, or Firm—Burr & Brown

(57) ABSTRACT

An optical waveguide plate for a display including a main optical waveguide plate body for introducing light from a light source thereinto, and surface-smoothing materials formed on both surfaces of the main optical waveguide plate body and having approximately the same optical refractive index as that of an optical waveguide plate. The main optical waveguide plate body is composed of a transparent material such as glass and acrylic resin, because it is necessary to totally reflect the introduced light. The surface-smoothing material is composed of, for example, a liquid having good wettability with respect to the main optical waveguide plate body. The range, in which the optical refractive index of the surface-smoothing material is approximately the same as the optical refractive index of the main optical waveguide plate body, lies in $0.8n \leq m \leq 1.2n$ provided that the optical refractive index of the surface-smoothing material is m, and the optical refractive index of the main optical waveguide plate body is n. It is possible to decrease the plane roughness on the surface of the main optical waveguide plate body, substantially eliminate scratches, dirt and the like, and improve the contrast and brightness of the display.

9 Claims, 11 Drawing Sheets

(EXTERNAL SPACE)

(EXTERNAL SPACE)

$n_2 > n_1$ $n_2 < n_1$ $n_0 < n_1 < n_2 < m$

OPTICAL WAVEGUIDE PLATE FOR DISPLAY

BACKGROUND OF THE INVENTION

1. Field of the Invention

The present invention relates to an optical waveguide plate to be used for a display which consumes less electric power, and which has large screen brightness. In particular, the present invention relates to a structure of the optical waveguide plate to be used for the display for displaying, on the optical waveguide plate, a picture image corresponding to an image signal by controlling leakage light at a predetermined position on the optical waveguide plate by controlling the displacement action of an actuator element in a direction to make contact or separation with respect to the optical waveguide plate in accordance with an attribute of the image signal to be inputted.

2. Description of the Related Art

Those hitherto known as the display include, for example, cathode ray tubes (CRT) and liquid crystal display devices.

Those known as the cathode ray tube include, for example, ordinary television receivers and monitor units for computers. Although the cathode ray tube has a bright screen, it consumes a large amount of electric power. Further, the cathode ray tube involves a problem that the depth of the entire display device is large as compared with the size of the screen.

On the other hand, the liquid crystal display device is advantageous in that the entire device can be miniaturized, and the display device consumes a small amount of electric power. However, the liquid crystal display device involves problems that it is inferior in brightness of the screen, and the field angle of the screen is narrow.

In the case of the cathode ray tube and the liquid crystal display device, it is necessary for a color screen to use a number of picture elements (image pixels) which is three times a number of picture elements used in a black-and-white screen. For this reason, other problems occur in that the device itself is complicated, a great deal of electric power is consumed, and it is inevitable that cost is increased.

In order to solve the problems described above, the present applicant has suggested a novel display (see, for example, Japanese Laid-Open Patent Publication No. 7-287176). As shown in FIG. 14, this display includes actuator elements 100 arranged for respective picture elements. Each of the actuator elements 100 comprises a main actuator element 108 including a piezoelectric/electrostrictive layer 102 and an upper electrode 104 and a lower electrode 106 formed on upper and lower surfaces of the piezoelectric/electrostrictive layer 102 respectively, and a substrate 114 including a vibrating section 110 and a fixed section 112 disposed under the main actuator element 108. The lower electrode 106 of the main actuator element 108 contacts with the vibrating section 110. The main actuator element 108 is supported by the vibrating section 110.

The substrate 114 is composed of a ceramic in which the vibrating section 110 and the fixed section 112 are integrated into one unit. A recess 116 is formed in the substrate 114 so that the vibrating section 110 is thin-walled.

A displacement-transmitting section 120 for obtaining a predetermined size of contact area with an optical waveguide plate 118 is connected with the upper electrode 104 of the main actuator element 108. In the illustrative display shown in FIG. 14, the displacement-transmitting section 120 is arranged such that it is located closely near to the optical waveguide plate 118 in the ordinary state in which the actuator element 100 stands still, while it contacts with the optical waveguide plate 118 in the excited state at a distance of not more than the wavelength of the light.

The light 122 is introduced, for example, from a lateral end of the optical waveguide plate 118. In this arrangement, all of the light 122 is totally reflected at the inside of the optical waveguide plate 118 without being transmitted through front and back surfaces thereof by controlling the magnitude of the refractive index of the optical waveguide plate 118. In this state, a voltage signal corresponding to an attribute of an image signal is selectively applied to the actuator element 100 by the aid of the upper electrode 104 and the lower electrode 106 so that the actuator element 100 is allowed to make displacement in conformity with the ordinary state and the excited state. Thus, the displacement-transmitting section 120 is controlled for its contact and separation with respect to the optical waveguide plate 118. Accordingly, the scattered light (leakage light) 124 is controlled at a predetermined portion of the optical waveguide plate 118, and a picture image corresponding to the image signal is displayed on the optical waveguide plate 118.

The display described above is advantageous, for example, in that (1) it is possible to decrease the electric power consumption, (2) it is possible to increase the screen brightness, and (3) it is unnecessary to increase the number of picture elements as compared with the black-and-white screen when the display is allowed to have a color screen.

By the way, as shown in FIGS. 15 and 16, the optical waveguide plate 118 is composed of a transparent material such as glass and acrylic resin, because it is necessary that the light 122 introduced from a light source 126 is totally reflected. However, it is feared that light emission (false light emission) occurs due to, for example, plane roughness, scratches, and dirt on the surface of the transparent material even at portions which should not be subjected to light emission, and the contrast of the display (ratio between the brightness of the display portion and the brightness of the non-display portion) is lowered. FIG. 15 shows an example of occurrence of the false light emission due to the scratch "a" formed on the surface of the optical waveguide plate 118. FIG. 16 shows an example of occurrence of the false light emission due to the dirt "b" adhered to the surface of the optical waveguide plate 118.

Further, the light emission occurs at portions (non-display portions) which are not intended to effect light emission, and hence the incident light is decreased at portions (display portions) which are intended to effect light emission. Therefore, it is feared that the decrease in brightness would be caused.

SUMMARY OF THE INVENTION

The present invention has been made taking the foregoing problems into consideration, an object of which is to provide an optical waveguide plate for a display which makes it possible to decrease the plane roughness on the surface of a main optical waveguide plate body, substantially eliminate scratches, dirt and the like, and improve the contrast and the brightness of the display.

At first, it is premised that an optical waveguide plate for a display according to the present invention is used for the display comprising a driving section including a number of actuator elements arranged corresponding to a large number of picture elements, in particular the display for displaying, on the optical waveguide plate, a picture image corresponding to an image signal by controlling leakage light at a predetermined portion of the optical waveguide plate by controlling displacement action of each of the actuator elements in a direction to make contact or separation with respect to the optical waveguide plate in accordance with an attribute of the image signal to be inputted.

The optical waveguide plate according to the present invention is constructed such that a surface-smoothing material, which has substantially the same optical refractive index as that of a main optical waveguide plate body, is formed on at least one surface of the main optical waveguide plate body into which the light from a light source is introduced.

Accordingly, even when the main optical waveguide plate body involves a great deal of plane roughness on the surface, or even when the scratch or the dirt exists on the surface, the surface of the main optical waveguide plate body is optically smooth owing to the surface-smoothing material. That is, the plane roughness on the surface of the main optical waveguide plate body is decreased, and the scratch and the dirt are substantially eliminated. As a result, it is possible to reduce the occurrence of leakage light which would be otherwise caused at portions (non-display portions) which are not intended to effect light emission. Thus, it is possible to improve the contrast (ratio between the brightness of the display portion and the brightness of the non-display portion) of the display.

Moreover, the light component (leakage component), which has been hitherto leaked due to, for example, the scratch and the dirt existing on the surface of the main optical waveguide plate body, is reduced owing to the presence of the surface-smoothing material. Simultaneously, the light corresponding to the amount of reduction is utilized for light emission effected at the portions (display portions) which are intended to effect light emission. Therefore, the brightness of the display is improved as well.

The reason why the optical refractive index of the surface-smoothing material is substantially the same as the optical refractive index of the optical waveguide plate at the main optical waveguide plate body is that it is intended to reduce reflection and scattering of light at the interface between the main optical waveguide plate body and the surface-smoothing material. In the present invention, it is preferable that the optical refractive index m of the surface-smoothing material satisfies $0.8n \leq m \leq 1.2n$ provided that the optical refractive index of the main optical waveguide plate body is represented by n. More desirably, there is given $0.9n \leq m \leq 1.1n$.

The surface-smoothing material may be a liquid having good wettability with respect to the optical waveguide plate. Alternatively, the surface-smoothing material may be a transparent resin layer such as those composed of an adhesive secured or glued to the main optical waveguide plate body. The liquid having good wettability is advantageous to form the smooth surface.

A flat plate may be fixed on the surface-smoothing material. In this embodiment, it is preferable that the flat plate may be fixed to the main optical waveguide plate body by using a joining material with the surface-smoothing material interposed therebetween.

The above and other objects, features, and advantages of the present invention will become more apparent from the following description when taken in conjunction with the accompanying drawings in which a preferred embodiment of th present invention is shown by way of illustrative example.

DESCRIPTION OF THE PREFERRED EMBODIMENTS

Illustrative embodiments of the optical waveguide plate for the display according to the present invention (hereinafter simply referred to as "optical waveguide plate according to the embodiment") will be explained below with reference to FIGS. 1 to 13. Prior thereto, explanation will be made with reference to FIG. 1 for the arrangement of the display D to which the optical waveguide plate according to the embodiment of the present invention is applied.

Figure 1:
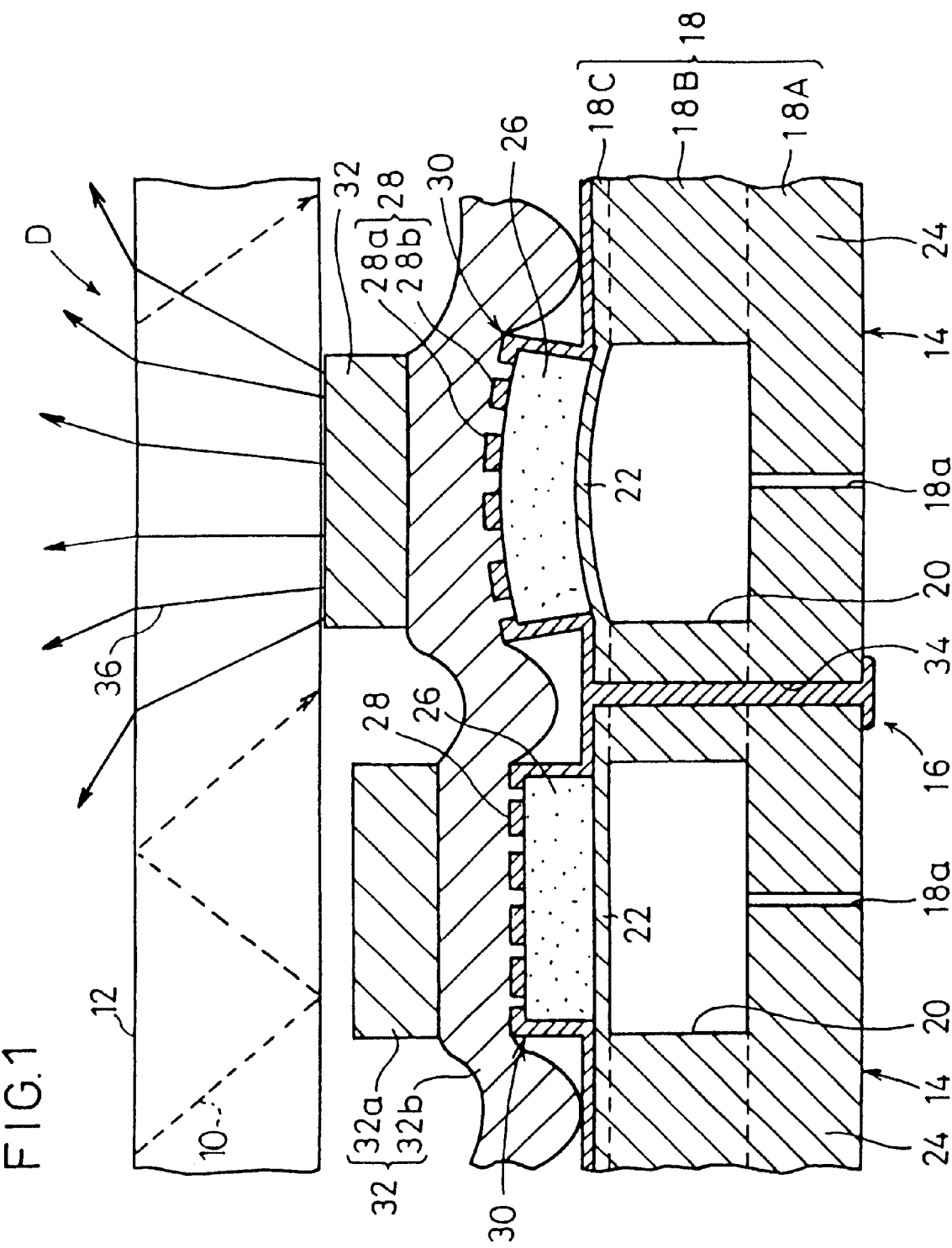
FIG. 1 shows a cross-sectional arrangement illustrating a display to which an optical waveguide plate according to the an embodiment of the present invention is applied.

As shown in FIG. 1, the display D comprises an optical waveguide plate 12 according to the embodiment of the present invention for introducing light 10 thereinto, and a driving section 16 provided opposingly to the back surface of the optical waveguide plate 12 and including a large number of actuator elements 14 which are arranged in a matrix configuration or in a zigzag configuration corresponding to picture elements (image pixels).

The driving section 16 includes a substrate 18 composed of, for example, a ceramic. The actuator elements 14 are arranged at positions corresponding to the respective picture elements on the substrate 18. The substrate 18 has its first principal surface which is arranged to oppose to the back surface of the optical waveguide plate 12. The first principal surface is a continuous surface (flushed surface). Hollow spaces 20 for forming respective vibrating sections, as described later on, are provided at positions corresponding to the respective picture elements at the inside of the substrate 18. The respective hollow spaces 20 communicate with the outside via through-holes 18a each having a small diameter and provided at a second principal surface of the substrate 18.

The portion of the substrate 18, at which the hollow space 20 is formed, is thin-walled. The other portion of the substrate 18 is thick-walled. The thin-walled portion has a structure which tends to undergo vibration in response to external stress, and it functions as a vibrating section 22. The portion other than the hollow space 20 is thick-walled, and it functions as a fixed section 24 for supporting the vibrating section 22.

That is, the substrate 18 has a stacked structure comprising a substrate layer 18A as a lowermost layer, a spacer layer 18B as an intermediate layer, and a thin plate layer 18C as an uppermost layer. The substrate 18 can be recognized as an integrated structure including the hollow spaces 20 formed at the positions in the spacer layer 18B corresponding to the picture elements. The substrate layer 18A functions as a substrate for reinforcement, as well as it functions as a substrate for wiring. The substrate 18 may be sintered in an integrated manner, or it may be additionally attached.

As shown in FIG. 1, each of the actuator elements 14 comprises the vibrating section 22 and the fixed section 24 described above, as well as a main actuator element 30 including a shape-retaining layer 26 composed of, for example, a piezoelectric/electrostrictive layer or an antiferroelectric layer directly formed on the vibrating section 22 and a pair of electrodes 28 (a row electrode 28a and a column electrode 28b) formed on an upper surface of the shape-retaining layer 26, and a displacement-transmitting section 32 connected onto the main actuator element 30, for increasing the contact area with respect to the optical waveguide plate 12 to obtain an area corresponding to the picture element.

That is, the display D has the structure in which the main actuator elements 30 comprising the shape-retaining layers 26 and the pairs of electrodes 28 are formed on the substrate 18. The pair of electrodes 28 may have a structure in which they are formed on upper and lower sides of the shape-retaining layer 26, or they are formed on only one side of the shape-retaining layer 26. However, in order to advantageously join the substrate 18 and the shape-retaining layer 26, it is preferable that the pair of electrodes 28 are formed only on the upper side (the side opposite to the substrate 18) of the shape-retaining layer 26 so that the substrate 18 directly contacts with the shape-retaining layer 26 without any difference in height, as in the display D. In the illustrative arrangement shown in FIG. 1, for example, the row electrode 28a is led to the back surface side of the substrate 18 through the through-hole 34.

Next, the operation of the display D constructed as described above will be briefly described with reference to FIG. 1. At first, the light 10 is introduced, for example, from the end portion of the optical waveguide plate 12. In this embodiment, all of the light 10 is totally reflected at the inside of the optical waveguide plate 12 without being transmitted through the front and back surfaces thereof by controlling the magnitude of the refractive index of the optical waveguide plate 12. In this embodiment, the optical waveguide plate 12 desirably has a refractive index n of 1.3 to 1.8, and more desirably 1.4 to 1.7.

In this state, when a certain actuator element 14 is in the selected state, and the displacement-transmitting section 32 corresponding to the actuator element 14 contacts, at a distance of not more than the wavelength of light, with the back surface of the optical waveguide plate 12, then the light 10, which has been subjected to total reflection, is transmitted to the surface of the displacement-transmitting section 32 contacting with the back surface of the optical waveguide plate 12.

The displacement-transmitting section 32 is provided to reflect the light 10 transmitted through the back surface of the optical waveguide plate 12, and it is provided to increase the contact area with respect to the optical waveguide plate 12 to be not less than a predetermined size. That is, the light emission area is determined by the contact area between the displacement-transmitting section 32 and the optical waveguide plate 12.

In the display D described above, the displacement-transmitting section 32 includes a plate member 32a for determining the substantial light emission area, and a displacement-transmitting member 32b for transmitting the displacement of the main actuator element 30 to the plate member 32a.

The contact between the displacement-transmitting section 32 and the optical waveguide plate 12 means the displacement-transmitting section 32 and the optical waveguide plate 12 are positioned at a distance of not more than the wavelength of the light 10 (light 10 introduced into the optical waveguide plate 12).

Once the light 10 arrives at the surface of the displacement-transmitting section 32, the light 10 is reflected by the surface of the displacement-transmitting section 32, and it behaves as scattered light 36. A part of the scattered light 36 is reflected again in the optical waveguide plate 12. However, almost all of the scattered light 36 is not reflected by the optical waveguide plate 12, and it is transmitted through the front surface of the optical waveguide plate 12. The displacement-transmitting section 32 makes contact with the back surface of the optical waveguide plate 12 corresponding to the bending displacement of the main actuator element 30. When the displacement-transmitting section 32 contacts with the back surface of the optical waveguide plate 12, for example, the light 10, which has been totally reflected at the inside of the optical waveguide plate 12, is transmitted through the back surface of the optical waveguide plate 12. The light 10 is transmitted to the surface of the displacement-transmitting section 32, and it is reflected by the surface of the displacement-transmitting section 32. Accordingly, the picture element corresponding to the actuator element 14 is in the ON state.

That is, the presence or absence of light emission (leakage light) at the front surface of the optical waveguide plate 12 can be controlled depending on the presence or absence of the contact of the displacement-transmitting section 32 disposed at the back of the optical waveguide plate 12. Especially, in the display device according to the embodiment of the present invention, one unit for making the displacement action of the displacement-transmitting section 32 in the direction to make contact or separation with respect to the optical waveguide plate 12 is regarded as one picture element. A large number of the picture elements are arranged in a matrix configuration or in a zigzag configuration concerning the respective rows. Therefore, it is possible to display a picture image (characters and graphics) corresponding to the image signal on the front surface of the optical waveguide plate 12, i.e., on the display screen, in the same manner as the cathode ray tube, the liquid crystal display device, and the plasma display, by controlling the displacement action in each of the picture elements in accordance with the attribute of the inputted image signal.

Figure 2:
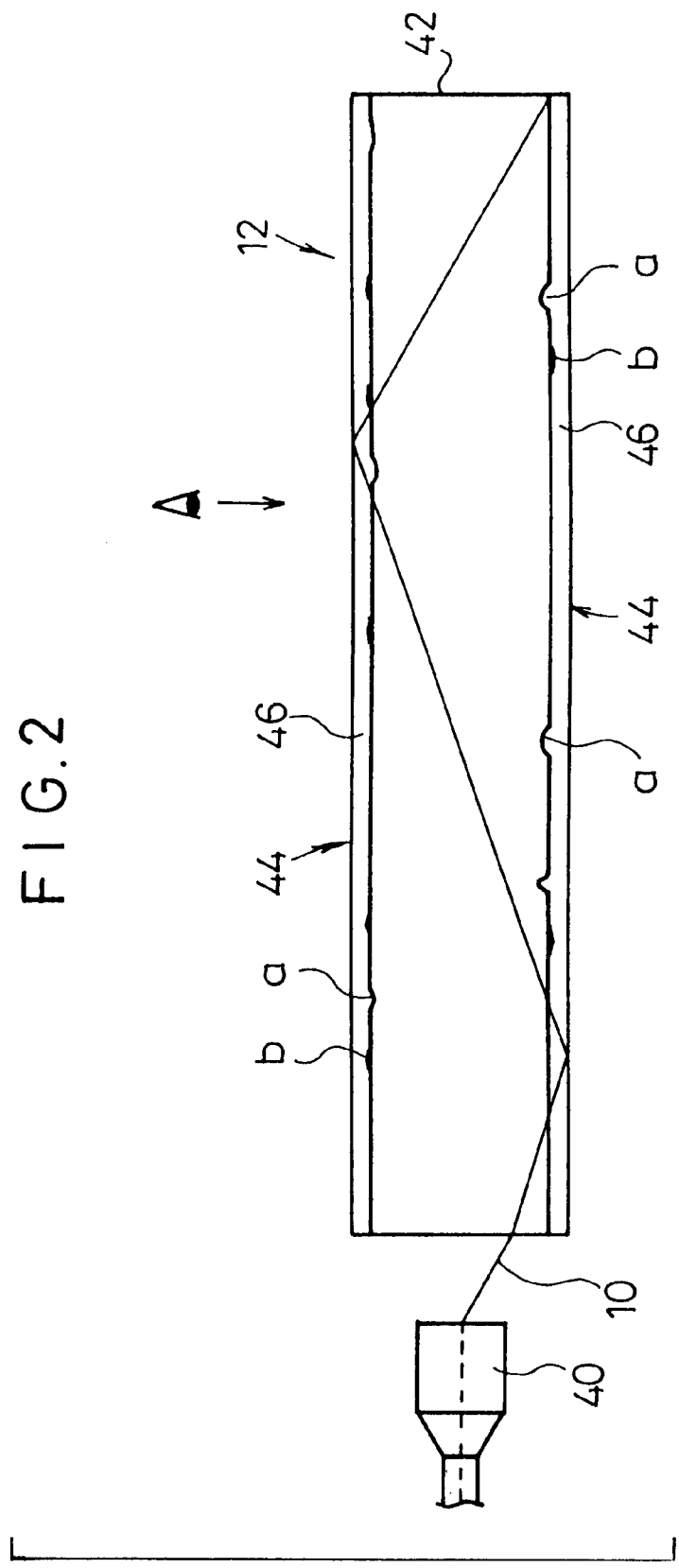
FIG. 2 shows a cross-sectional arrangement illustrating the optical waveguide plate according to the embodiment of the present invention.

As shown in FIG. 2, the optical waveguide plate 12 according to the embodiment of the present invention comprises a main optical waveguide plate body 42 for introducing the light 10 from a light source 40 thereinto, and surface-smoothing materials 44 having approximately the same optical refractive index as that of the optical waveguide plate 12 and formed on both surfaces of the main optical waveguide plate body 42.

The main optical waveguide plate body 42 is composed of a transparent material such as glass and acrylic resin, because it is necessary to totally reflect the introduced light 10. On the other hand, the surface-smoothing material 44 is composed of, for example, a liquid 46 having good wettability with respect to the main optical waveguide plate body 42.

Accordingly, even when the plane roughness is large, or even when the scratch "a" and the dirt "b" exist on the surface of the main optical waveguide plate body 42, the surface of the main optical waveguide plate body 42 is optically smooth owing to the presence of the surface-smoothing material 44. That is, the plane roughness of the surface of the main optical waveguide plate body 42 is decreased, and the scratch "a", the dirt "b" and the like are substantially eliminated. As a result, the occurrence of leakage light can be reduced at portions (non-display portions) which are not intended to effect light emission. It is possible to improve the contrast (ratio between the brightness of the display portion and the brightness of the non-display portion) of the display D.

Moreover, the light component (leakage component), which has been hitherto leaked due to, for example, the scratch "a" and the dirt "b" existing on the surface of the main optical waveguide plate body 42, is reduced owing to the presence of the surface-smoothing material 44. Simultaneously, the light corresponding to the amount of reduction is utilized for light emission effected at the portion (display portion) intended to cause light emission. Therefore, the brightness of the display D is improved as well.

The reason why the optical refractive index of the surface-smoothing material 44 is substantially the same as the optical refractive index of the main optical waveguide plate body 42 will now be explained.

Figure 3A:
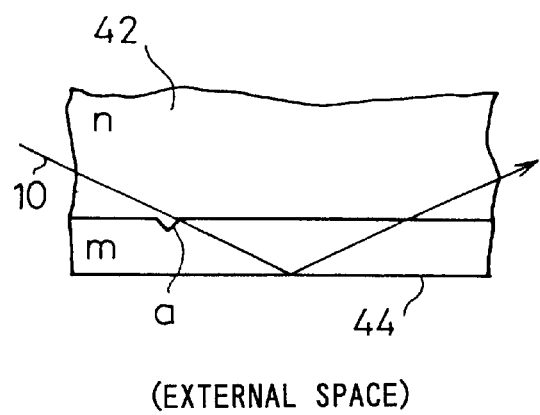
FIG. 3A illustrates an optical path obtained when a surface-smoothing material has approximately the same optical refractive index as an optical refractive index of the main optical waveguide plate body.
Figure 3B:
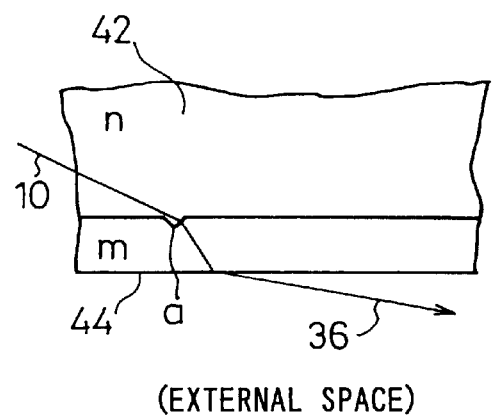
FIG. 3B illustrates an optical path obtained when a surface-smoothing material has an optical refractive index different from the optical refractive index of the main optical waveguide plate body.

As shown in FIG. 3A, when the optical refractive index of the surface-smoothing material 44 is substantially the same as the optical refractive index of the main optical waveguide plate body 42, the light 10, which has entered the surface-smoothing material 44 through the scratch "a" located on the surface of the main optical waveguide plate 42, is totally reflected by the interface between the surface-smoothing material 44 and the external space (air). That is, the light is not recognized as the scattered light 36, and no excessive light emission (false light emission) is caused at the non-display portion.

On the other hand, when the optical refractive index of the surface-smoothing material 44 is different from the optical refractive index of the main optical waveguide plate body 42, the light 10, which has entered the surface-smoothing material 44 through the scratch "a" located on the surface of the main optical waveguide plate 42, is radiated as leakage light toward the outside through the interface between the surface-smoothing material 44 and the external space. That is, the light is recognized as the scattered light 36, and false light emission takes place.

The range, in which the optical refractive index of the surface-smoothing material 44 is approximately the same as the optical refractive index of the main optical waveguide plate body 42, is represented by $0.8n_1 \leq m \leq 1.2n_1$ (more preferably, $0.9n_1 \leq m \leq 1.1\ n_1$) provided that the optical refractive index of the surface-smoothing material 44 is represented by m, and the optical refractive index of the main optical waveguide plate body 42 is represented by $n_1$. When this condition is satisfied, the effect of the surface-smoothing material 44 as described above can be sufficiently exhibited.

In the embodiment shown in FIG. 2, the liquid 46 for constructing the surface-smoothing material 44 is formed on the both surfaces of the main optical waveguide plate body 42. However, it is not necessarily indispensable to form the liquid 46 on the surface of the driving section.

Next, modified embodiments of the optical waveguide plate 12 according to the embodiment described above will be explained with reference to FIGS. 4 to 9.

Figure 4:
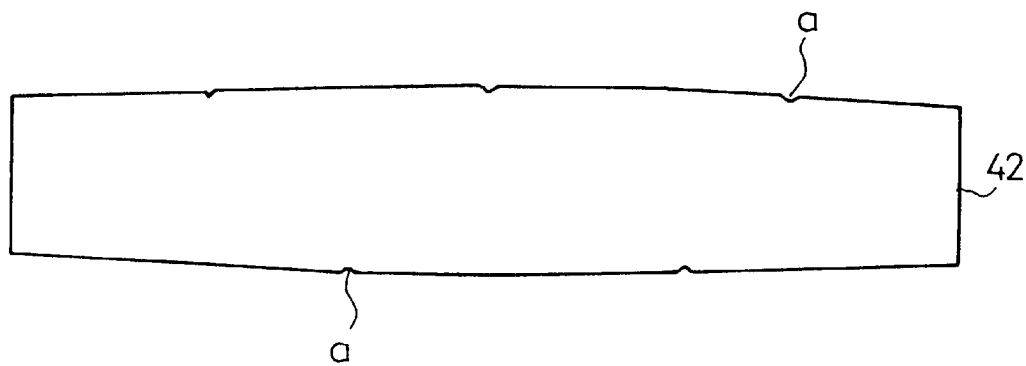
FIG. 4 illustrates an inconvenience caused when a main optical waveguide plate body is composed of an acrylic resin.

As shown in FIG. 4, when the main optical waveguide plate body 42 is composed of, for example, an acrylic resin, the surface tends to suffer scratches "a". Further, the plate made of the acrylic resin is insufficient in rigidity as compared with the glass plate, and hence such a plate tends to suffer from waviness and warpage.

Figure 5:
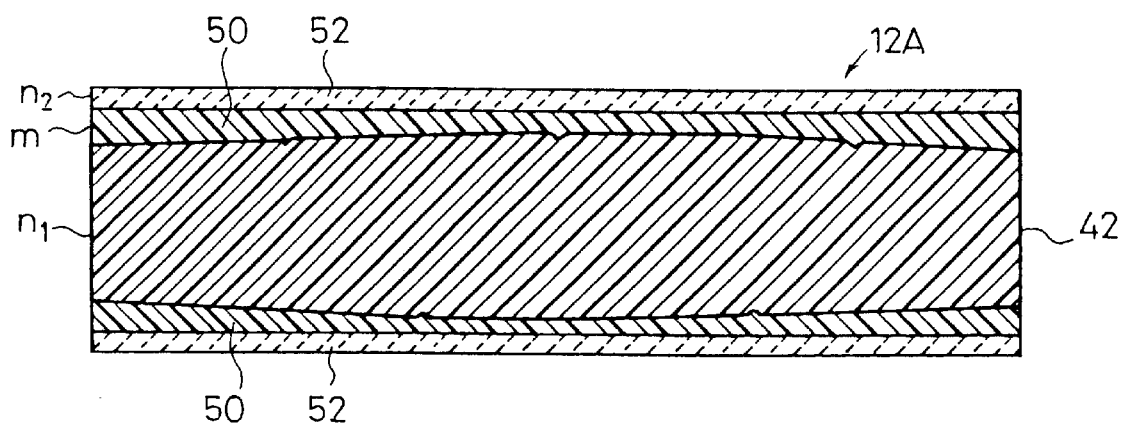
FIG. 5 shows a cross-sectional arrangement of an optical waveguide plate concerning a modified embodiment.

Thus, as shown in FIG. 5, an optical waveguide plate 12A according to this modified embodiment comprises joining layers (adhesive layers) 50 which are composed of, for example, a transparent resin and which are formed on both surfaces of a main optical waveguide plate body 42, and rigid transparent plates 52 which are thinner than the main optical waveguide plate body 42 and which are joined (glued) onto the joining layers 50. In this embodiment, the surface-smoothing material 44 is constructed by the joining layer 50. Those usable as the rigid transparent plate 52 include, for example, white glass plates and inexpensive colored glass plates.

In this embodiment, the main optical waveguide plate body 42 has a thickness $t_1$ of about 10 mm to 200 mm. The rigid transparent plate has a thickness $t_2$ of about 0.1 mm to 3 mm. On this assumption, it is desirable to give $5t_2 \leq t_1 \leq 500t_2$. When the colored glass plate is used as the rigid transparent plate 52, it is desirable to set the thicknesses $t_1$ and $t_2$ to satisfy $10t_2 \leq t_1 \leq 500t_2$ so that the optical path of the light passing through the glass plate is short, in order to avoid discrepancy of the objective color of the light and to avoid loss due to the absorption of light.

The optical refractive index m of the joining layer 50 is approximately the same as the optical refractive index $n_1$ of the main optical waveguide plate body 42. Also in this case, it is desirable to satisfy $0.8n_1 \leq m \leq 1.2n_1$, and more preferably $0.9n_1 \leq m \leq 1.1n_1$. In relation to the optical refractive index $n_2$ of the rigid transparent plate, it is desirable to satisfy $0.8n_2 \leq m \leq 1.2n_2$, and more preferably $0.9n_2 \leq m \leq 1.1n_2$.

Figure 6:
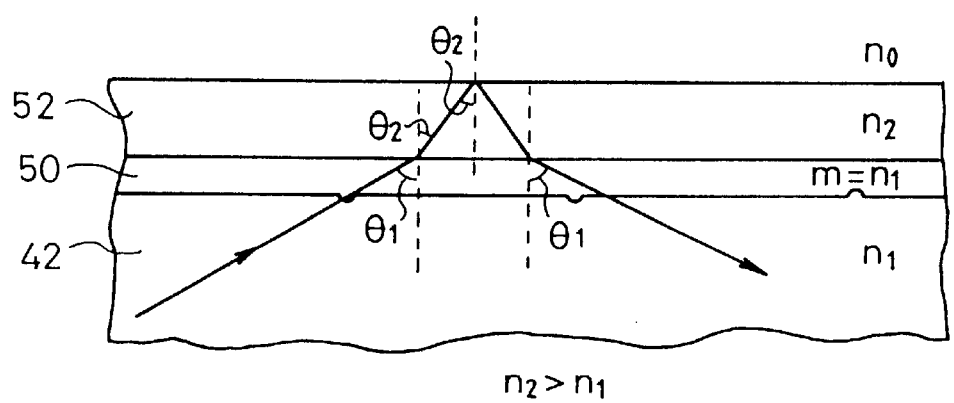
FIG. 6 illustrates an optical path obtained in the case of the use of a rigid transparent plate which has its optical refractive index $n_2$ larger than an optical refractive index $n_1$ of a main optical waveguide plate body.
Figure 7:
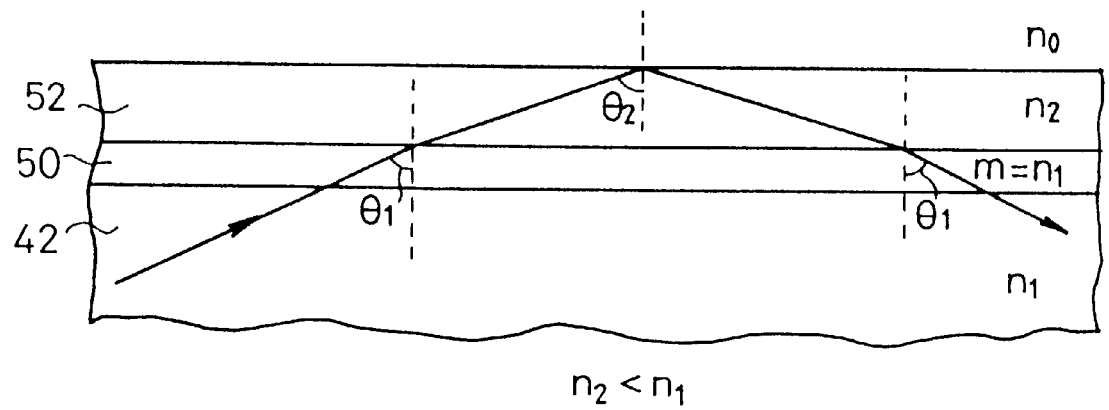
FIG. 7 illustrates an optical path obtained in the case of the use of a rigid transparent plate which has its optical refractive index $n_2$ smaller than the optical refractive index $n_1$ of the main optical waveguide plate body.

In this embodiment, for example, the optical path followed in the optical waveguide plate 12A is represented by optical paths shown in FIGS. 6 and 7. FIGS. 6 and 7 are depicted assuming that the optical refractive indices of the main optical waveguide plate body 42, the joining layer 50, the rigid transparent plate 52, and the external space are $n_1$, m $(=n_1)$, $n_2$, and no (air=1.0) respectively.

The embodiment shown in FIG. 6 illustrates an example of the use of a rigid transparent plate 52 having its optical refractive index $n_2$ which is larger than the optical refractive index $n_1$ of the main optical waveguide plate body 42. All of the light on the optical path, which satisfies the condition described below, is totally reflected by the interface between the rigid transparent plate 52 and the external space, and the light returns into the main optical waveguide plate body 42.

The optical path, which satisfies the condition, is the optical path other than optical paths along which the light scattered from the light emission portion (display portion) follows, i.e., the optical path along which the light not intended to effect leakage to the outside follows. Specifically, the optical path is represented by an optical path in which the angle of incidence $\theta_1$ into the interface between the joining layer 50 and the rigid transparent plate 52 is not less than a critical angle $\theta c_{10}$, and the angle of outgoing radiation $\theta_2$ from the interface is not less than a critical angle $\theta c_{20}$.

It is noted that there are given:

critical angle $\theta c_{10} = \sin^{-1}(n_0/n_1)$;

critical angle $\theta c_{20} = \sin^{-1}(n_0/n_2)$.

The embodiment shown in FIG. 7 illustrates an example of the use of a rigid transparent plate 52 having its optical refractive index $n_2$ which is smaller than the optical refractive index $n_1$ of the main optical waveguide plate body 42. Also in this case, all of the light on the optical path, which satisfies the condition described above, i.e., the light, which follows the optical path and which is not intended to cause leakage to the outside, is totally reflected by the interface between the rigid transparent plate 52 and the external space, and the light returns into the main optical waveguide plate body 42.

Figure 8:
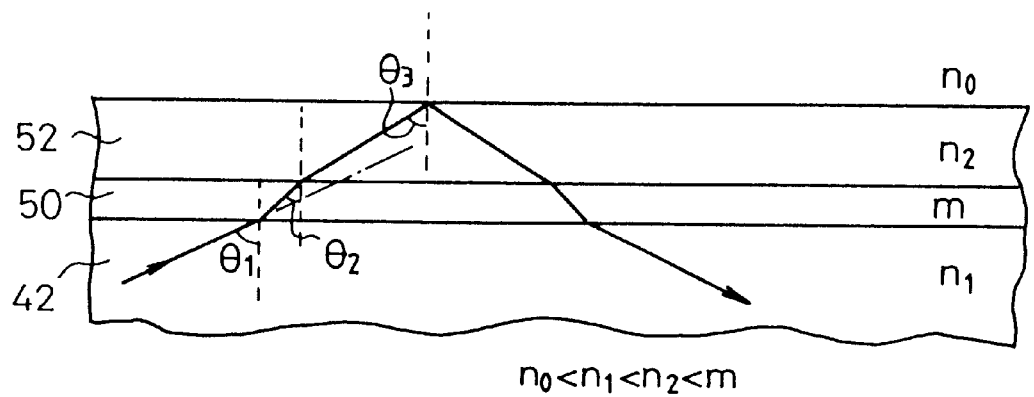
FIG. 8 illustrates a condition for totally reflecting the light not intended to effect leakage to the outside, at a boundary between a rigid transparent plate and the external space, when an optical refractive index of a joining layer is different from an optical refractive index of a main optical waveguide plate body.

In the embodiment described above, it has been demonstrated that when the optical refractive index m of the joining layer 50 is approximately the same as the optical refractive index $n_1$ of the main optical waveguide plate body 42, the light, which is not intended to cause leakage to the outside, is totally reflected by the interface between the rigid transparent plate 52 and the external space. However, as shown in FIG. 8, even when the optical refractive index m of the joining layer 50 is different from the optical refractive index $n_1$ of the main optical waveguide plate body 42 (m≠$n_1$), the light, which is not intended to cause leakage to the outside, can be totally reflected by the interface between the rigid transparent plate 52 and the external space in the same manner as described above provided that the relative magnitude of the optical refractive index satisfies $n_0 < n_1 < n_2 < m$ (wherein $\theta_2 < \theta_3 < \theta_1$).

However, the optical refractive index m of the joining layer 50 is excessively large as compared with the optical refractive index $n_1$ of the main optical waveguide plate body 42 and the optical refractive index $n_2$ of the rigid transparent plate 52, the catoptric light is generated at the interface between the main optical waveguide plate body 42 and the joining layer 50 or at the interface between the rigid transparent plate 52 and the joining layer 50. For this reason, a problem arises in that the display is darkened as a whole.

Therefore, the optical refractive index m of the joining layer 50 desirably satisfies, in relation to the main optical waveguide plate body 42, $0.8n_1 \leq m \leq 1.2n_1$, and preferably $0.9n_1 \leq m \leq 1.1n_1$. The optical refractive index m of the joining layer 50 desirably satisfies, in relation to the rigid transparent plate 52, $0.8n_2 \leq m \leq 1.2n_2$, and preferably $0.9n_2 \leq m \leq 1.1n_2$.

Those preferably used for the joining layer 50 include thermosetting resins (including ultraviolet curable resins) and thermoplastic resins having transparency in the visible light wavelength region, such as those composed of acrylic, unsaturated polyester, silicone, phenol, polyethylene, and epoxy compounds.

Figure 9:
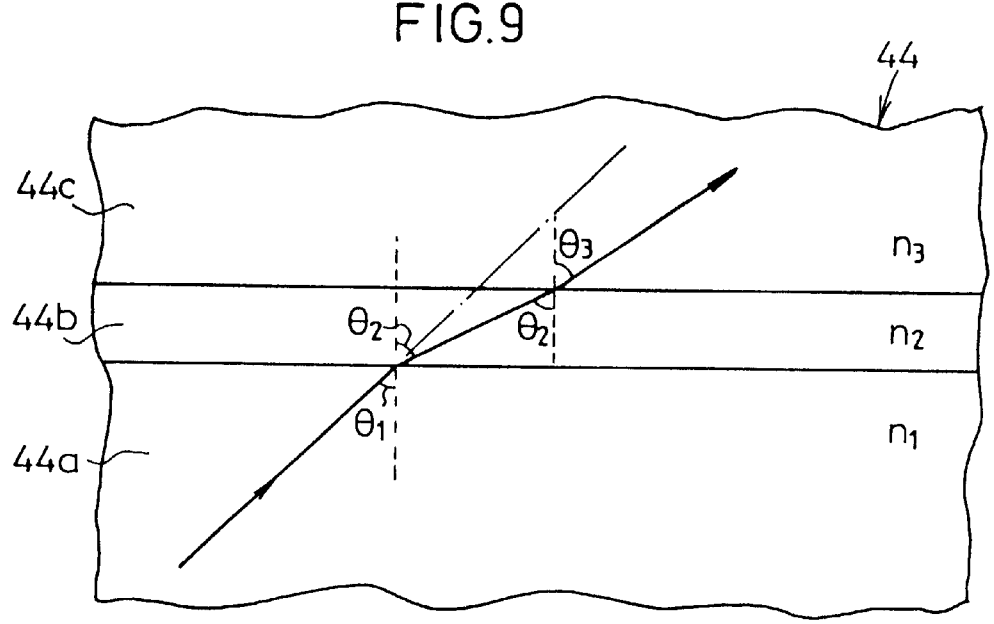
FIG. 9 illustrates a relationship between the angle of incidence and the angle of outgoing radiation, obtained when a surface-smoothing material having a three-layered structure is formed on a main optical waveguide plate body.

The relationship between the angle of incidence and the angle of outgoing radiation is shown in FIG. 9 when a surface-smoothing material 44 having a multiple-layered structure is used on the main optical waveguide plate body 42. For example, when a surface-smoothing material 44 having a three-layered structure is exemplified, the following expressions are given according to the Snell's law, provided that the optical refractive indexes of a first layer 44a, a second layer 44b, and a third layer 44c are $n_1$, $n_2$, and $n_3$ respectively, the angle of incidence into the interface between the first layer 44a and the second layer 44b is $\theta_1$, the angle of outgoing radiation from the interface (=the angle of incidence into the interface between the second layer 44b and the third layer 44c) is $\theta_2$, and the angle of outgoing radiation from the interface between the second layer 44b and the third layer 44c is $\theta_3$.

$n_1 \sin \theta_1 = n_2 \sin \theta_2$ $n_2 \sin \theta_2 = n_3 \sin \theta_3$

Consequently, the following expressions are given.

$n_1 \sin \theta_1 = n_3 \sin \theta_3$ $\theta_3 = \sin^{-1}\{(n_1/n_3)\sin \theta_1\}$ That is, the angle of outgoing radiation $\theta_3$ from the interface between the second layer 44b and the third layer 44c depends on only the angle of incidence $\theta_1$ into the interface between the first layer 44a and the second layer 44b, and it does not depend on the optical refractive index $n_2$ of the intermediate second layer 44b. This fact is true for any surface-smoothing material 44 having three or more layers. The angle of outgoing radiation from the interface between the uppermost layer and the layer just thereunder depends on only the angle of incidence $\theta_1$ into the interface between the first layer and the second layer. However, it is assumed that there is no intermediate portion at which total reflection occurs. If there is any intermediate portion at which total reflection occurs, the display brightness is darkened. Therefore, it is desirable that the optical refractive indexes $n_1$, $n_2$, and $n_3$ are allowed to have the same relationship as those described above.

As described above, according to the optical waveguide plate 12A concerning the modified embodiment, the rigid transparent plates 52 are joined via the joining layers 50 on the both surfaces of the main optical waveguide plate body 42. Therefore, it is possible to increase the strength of the optical waveguide plate 12A, making it possible to apply the optical waveguide plate 12A to the large screen specification. Further, the rigid transparent plate 52 scarcely suffers from the scratch "a" as compared with the main optical waveguide plate body 42. Therefore, the formation of scratch is reduced on the display surface of the optical waveguide plate 12A. Moreover, for example, warpage and waviness are absorbed by the intervening joining layer 50. Thus, the optical waveguide plate 12A having high flatness as a whole is provided. Accordingly, it is possible to reduce any excessive light emission (false light emission) at the non-display portion, and it is possible to improve the contrast and the brightness of the display D.

Figure 10:
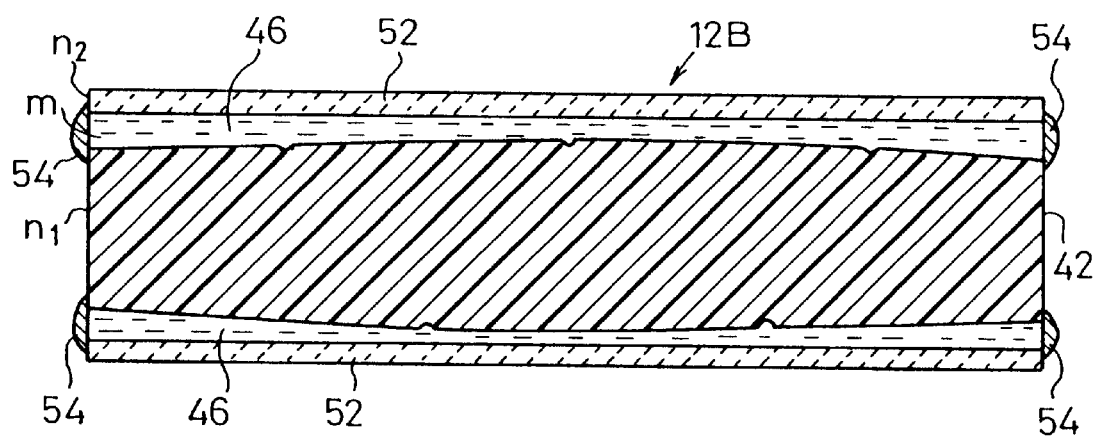
FIG. 10 shows a cross-sectional arrangement of another illustrative optical waveguide plate concerning a modified embodiment.

In the optical waveguide plate 12A concerning the modified embodiment described above, the rigid transparent plates 52 are glued through the joining layers 50 to the both surfaces of the main optical waveguide plate body 42 respectively. Alternatively, an arrangement as shown in FIG. 10 may be adopted. That is, rigid transparent plates 52 are fixed by using a joining material 54 while providing a certain degree of gaps over both surfaces of the main optical waveguide plate 42 respectively. A liquid 46 is injected into the gaps followed by drying and solidification.

A transparent film, which is composed of, for example, fluoride or oxide such as $SiO_2$, $MgF_2$, $LaF_3$, MgO, SiO, and $NdF_3$, may be formed on the rigid transparent plate 52 or the transparent resin layer as the surface-smoothing material 44.

In this embodiment, the film functions to eliminate scratches during the use, and it functions as an anti-reflection film, which is preferred.

The shape-retaining layer 26 of the main actuator element 30 will now be briefly described. When the piezoelectric/electrostrictive layer is used as the shape-retaining layer 26, those usable as the piezoelectric/electrostrictive layer include ceramics containing, for example, lead zirconate, lead magnesium niobate, lead nickel niobate, lead zinc niobate, lead manganese niobate, lead magnesium tantalate, lead nickel tantalate, lead antimony stannate, lead titanate, barium titanate, lead magnesium tungstate, and lead cobalt niobate, as well as any combination of them. It is needless to say that the major component contains the compound as described above in an amount of not less than 50% by weight. Among the ceramics described above, the ceramic containing lead zirconate is most frequently used as the constitutive material of the piezoelectric/electrostrictive layer according to the embodiment of the present invention.

When the piezoelectric/electrostrictive layer is composed of a ceramic, it is also preferable to use ceramics obtained by appropriately adding, to the ceramics described above, oxide of, for example, lanthanum, calcium, strontium, molybdenum, tungsten, barium, niobium, zinc, nickel, and manganese, or any combination thereof or another type of compound thereof. For example, it is preferable to use a ceramic containing a major component composed of lead magnesium niobate, lead zirconate, and lead titanate and further containing lanthanum and strontium.

The piezoelectric/electrostrictive layer may be either dense or porous. When the piezoelectric/electrostrictive layer is porous, its porosity is preferably not more than 40%.

When the anti-ferroelectric layer is used as the shape-retaining layer 26, it is desirable to use, as the anti-ferroelectric layer, a compound containing a major component composed of lead zirconate, a compound containing a major component composed of lead zirconate and lead stannate, a compound obtained by adding lanthanum to lead zirconate, and a compound obtained by adding lead zirconate and lead niobate to a component composed of lead zirconate and lead stannate.

Especially, when an anti-ferroelectric film, which contains a component comprising lead zirconate and lead stannate as represented by the following composition, is applied as a film-type element such as the anti-ferroelectric film-type element, it is possible to perform driving at a relatively low voltage. Therefore, application of such an anti-ferroelectric film is especially preferred.

$Pb_{0.99}Nb_{0.02}[(Zr_xSn_{1-x})_{1-y}Ti_y]_{0.98}O_3$ wherein, 0.5<x<0.6, 0.05<y<0.063, 0.01<Nb<0.03

The anti-ferroelectric layer may be porous. When the anti-ferroelectric layer is porous, it is desirable that the porosity is not more than 30%.

The optical waveguide plate for the display according to the present invention has been specifically explained on the basis of the optical waveguide plate according to the embodiment of the present invention and the optical waveguide plates according to the modified embodiments thereof. However, the present invention should not be interpreted as those limited by the embodiment and the modified embodiments, to which, for example, various modification, correction, and improvement may be added without deviating from the scope of the present invention.

EXAMPLE 1

Figure 11:
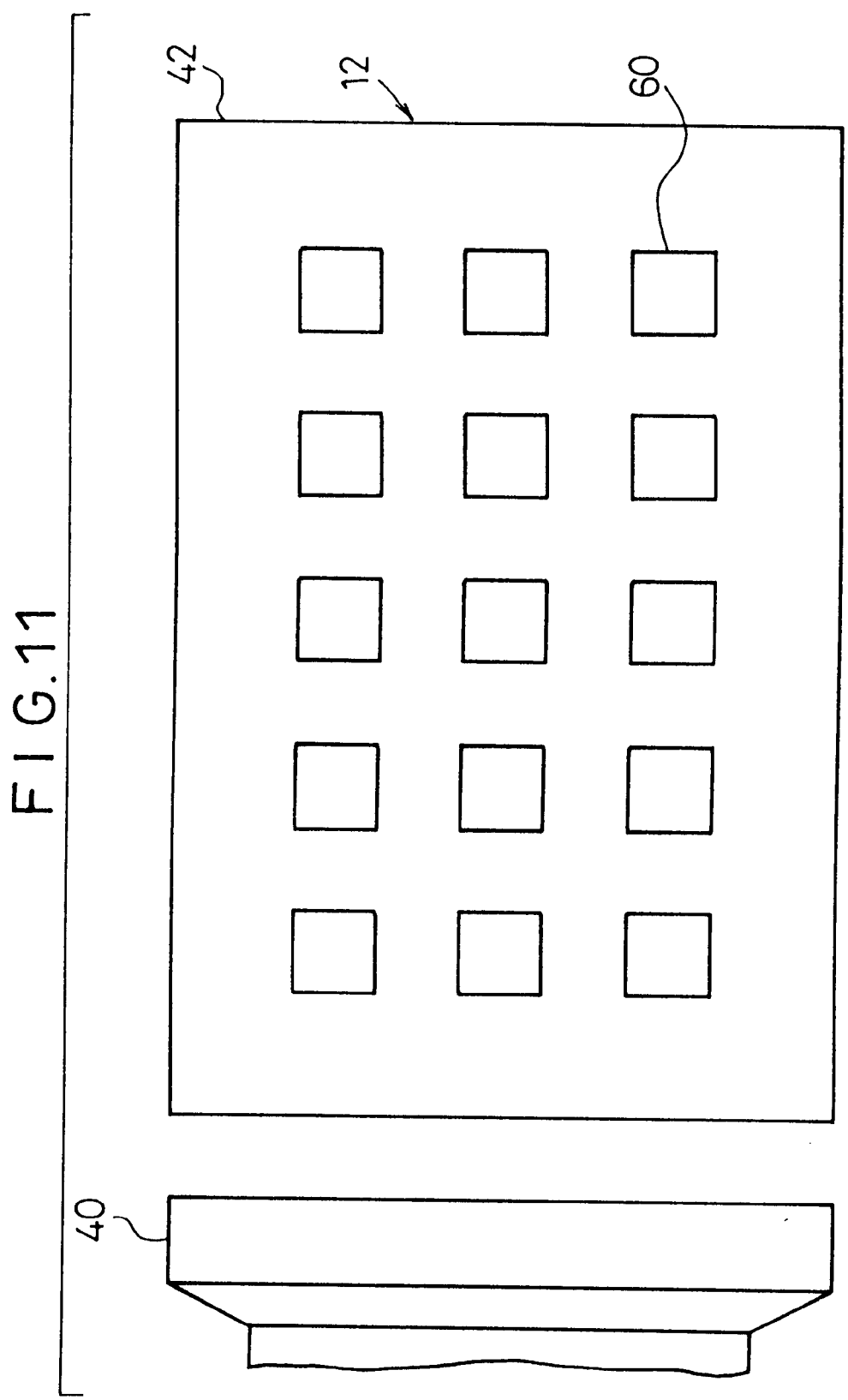
FIG. 11 shows a front view illustrating a device for measuring the brightness at display portions and the brightness at non-display portions concerning Example 1 and Comparative Example.
Figure 12:
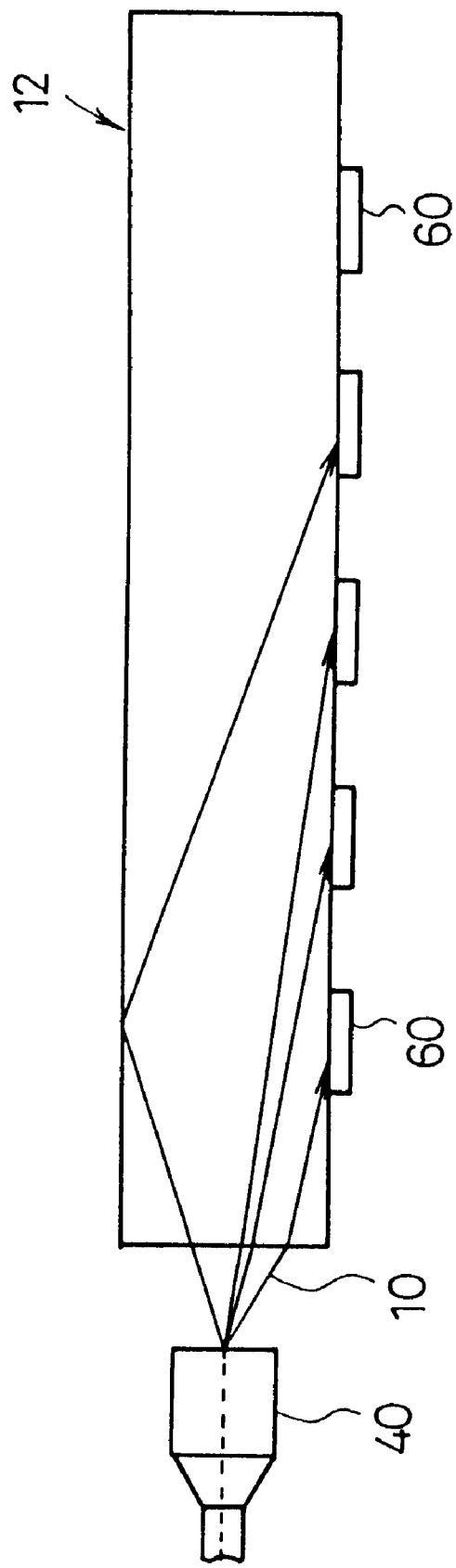
FIG. 12 shows a side view illustrating the device for measuring the brightness at the display portions and the brightness at the non-display portions concerning Example 1 and Comparative Example.

As shown in FIGS. 11 and 12, Example 1 and Comparative Example were prepared. In Example 1, a liquid 46 having an optical refractive index of 1.48 was applied to a display surface and an opposite surface of a main optical waveguide plate body 42 made of an acrylic resin having a shape of 200 mm×300 mm×10 mm and having an optical refractive index of 1.48 (see FIG. 2). In Comparative Example, nothing was applied to the main optical waveguide plate body 42.

Fifteen scattering elements (for example, aluminum pieces) 60 were arranged and glued in a matrix configuration (three ones in the vertical direction and five ones in the lateral direction) on the respective back surfaces (surfaces opposite to the display surfaces) of Example 1 and Comparative Example respectively. A light source 40 was arranged at the side surface of the optical waveguide plate 12, and the light 10 was introduced into the optical waveguide plate 12 from the light source 40 (see FIG. 12).

Figure 13:
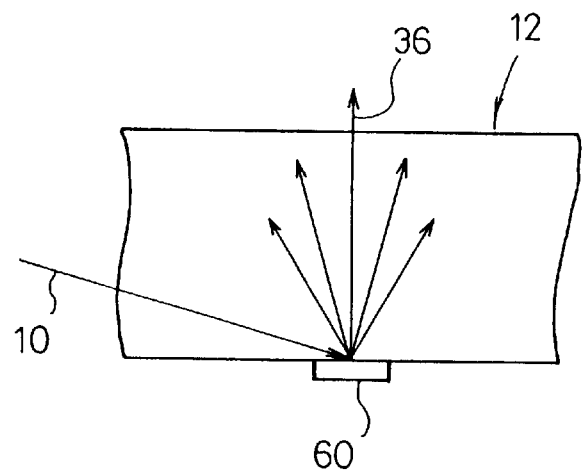
FIG. 13 illustrate a state of light emission obtained when the light is reflected by a surface of a scattering element.
Figure 14:
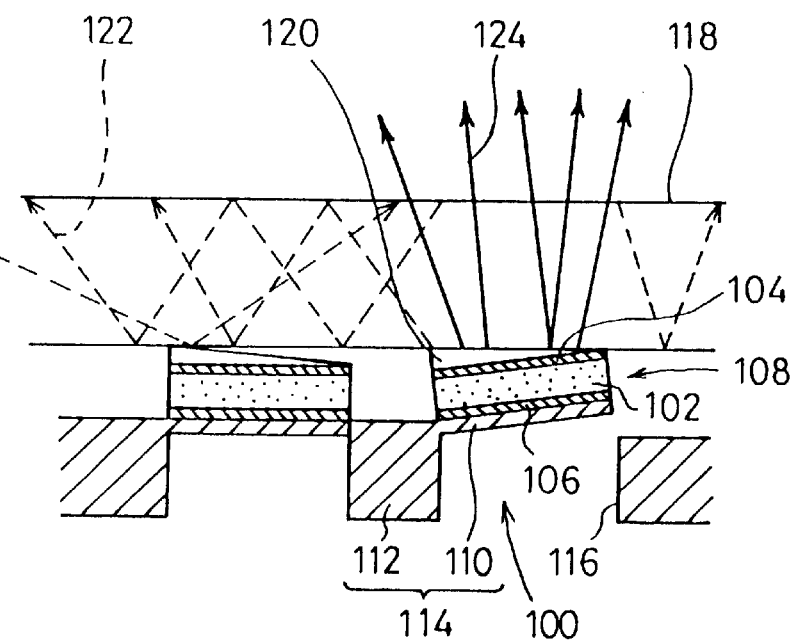
FIG. 14 shows an illustrative cross-sectional arrangement of a display hitherto suggested by the present applicant.
Figure 15:
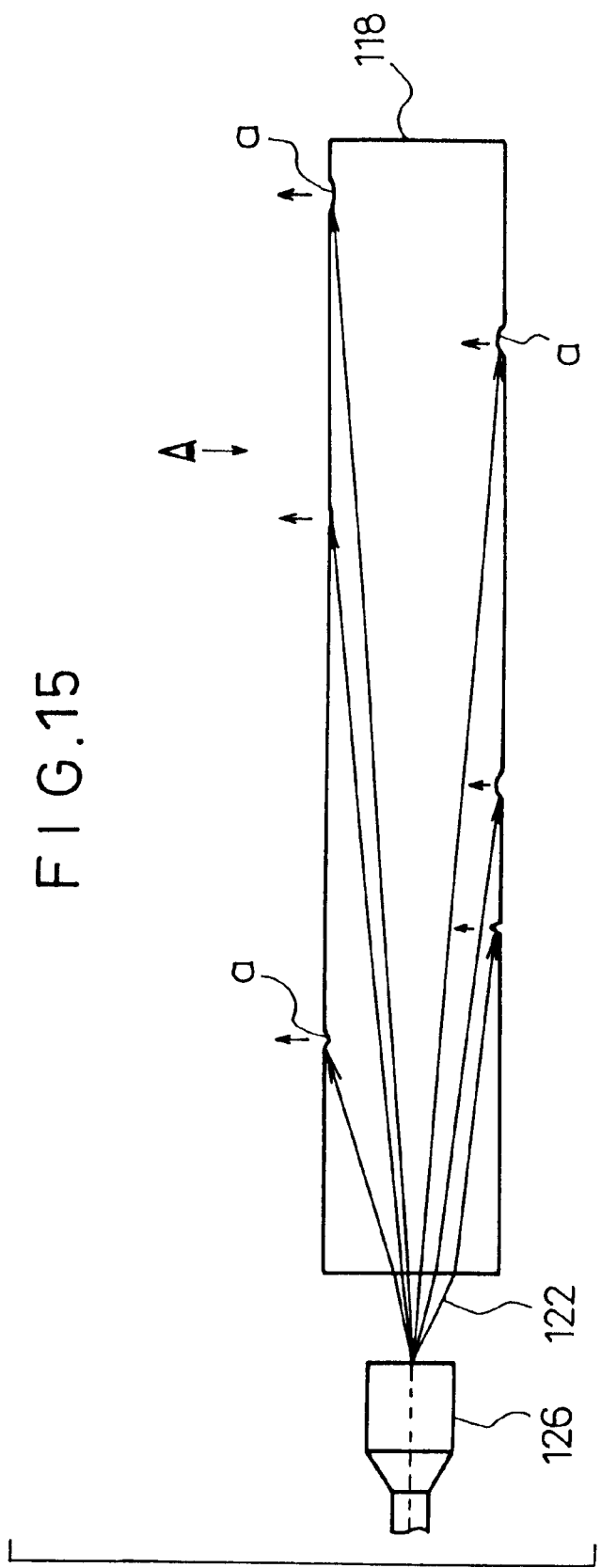
FIG. 15 illustrates a state in which false light emission is caused by scratches formed on the surface of the optical waveguide plate.
Figure 16:
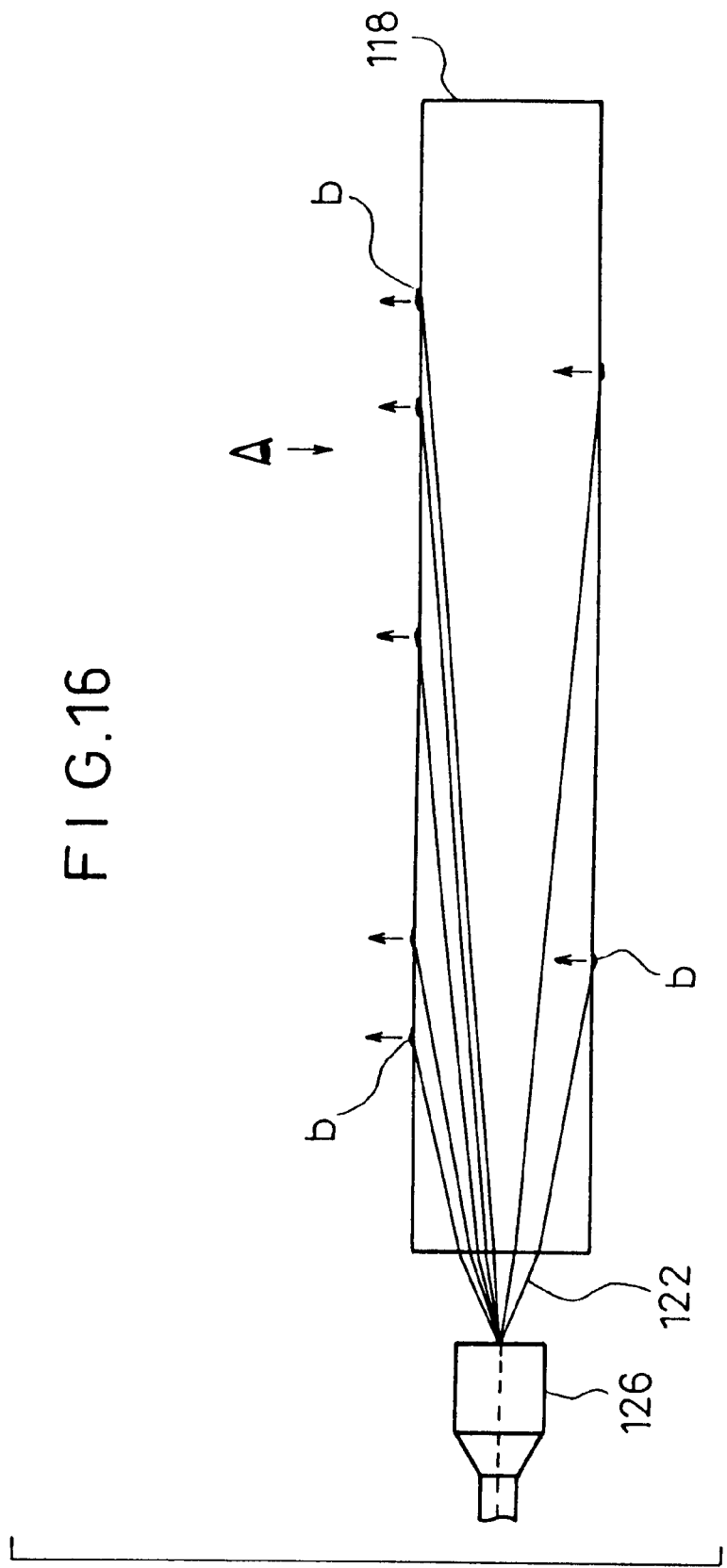
FIG. 16 illustrates a state in which false light emission is caused by dirt adhered to the surface of the optical waveguide plate.

In this arrangement, as shown in FIG. 13, the light 10, which has arrived at the surface of the scattering element 60, is reflected by the surface of the scattering element 60, and it behaves as scattered light 36. The scattered light 36 outgoes from the display surface of the optical waveguide plate 12. The portion of light emission effected by the scattering element 60 serves as the display portion of the optical waveguide plate 12.

The brightness at the display portion and the brightness at the portion different from the display portion (i.e., non-display portion) were measured for Example 1 and Comparative Example. As a result, in Example 1, the display brightness at the display portion was 7900 cd/m$^2$, and the brightness at the non-display portion was 40 cd/m$^2$. In Comparative Example, the display brightness at the display portion was 7700 cd/m$^2$, and the brightness at the non-display portion was 65 cd/m$^2$.

As understood from the result of measurement described above, the brightness at the non-display portion was decreased, and the display brightness at the display portion was improved in Example 1 as compared with Comparative Example. Further, in Example 1, the uniformity of brightness was also improved.

EXAMPLE 2

Next, Example 2 and Comparative Example were prepared.

In Example 2, glass plates were glued by using an acrylic adhesive having an optical refractive index of 1.48 to a display surface and an opposite surface of a main optical waveguide plate body 42 made of an acrylic resin having a shape of 200 mm×300 mm×10 mm and having an optical refractive index of 1.48 (see FIG. 5). In Comparative Example, nothing was applied to the main optical waveguide plate body 42. Fifteen scattering elements 60 were arranged and glued in a matrix configuration in the same manner as described above. A light source 40 was arranged at the side surface of the optical waveguide plate 12, and the light was introduced into the optical waveguide plate 12 from the light source 40 (see FIG. 12).

The brightness at the display portion and the brightness at the portion different from the display portion (i.e., non-display portion) were measured for Example 2 and Comparative Example. As a result, the brightness at the non-display portion was decreased, and the display brightness at the display portion was improved in Example 2 as compared with Comparative Example in the same manner as described above. Further, in Example 2, the uniformity of brightness was proved to be improved. Especially, in Example 2, it was proved that the display surface of the optical waveguide plate 12 scarcely suffered from scratches, simultaneously with which the rigidity was improved, and the warpage was decreased.

As explained above, according to the optical waveguide plate for the display, it is possible to decrease the plane roughness on the surface of the main optical waveguide plate body, it is possible to substantially eliminate scratches, dirt and the like, and it is possible to improve the contrast and the brightness of the display.

What is claimed is:

1. An optical waveguide plate to be used for a display comprising said optical waveguide plate for introducing light thereinto, and a driving section provided opposingly to one surface of said optical waveguide plate and including a number of actuator elements arranged corresponding to a large number of picture elements, for displaying, on said optical waveguide plate, a picture image corresponding to an image signal by controlling leakage light at a predetermined portion of said optical waveguide plate by controlling displacement action of each of said actuator elements in a direction to make contact or separation with respect to said optical waveguide plate in accordance with an attribute of said image signal to be inputted, wherein:

a surface-smoothing material, which has an optical refractive index greater than that of said optical waveguide plate, is formed on at least one surface of a main optical waveguide plate body into which said light from a light source is introduced.

2. The optical waveguide plate for said display according to claim 1, wherein the optical refractive index m of said surface-smoothing material satisfies:

$$m \leq 1.2n$$

provided that an optical refractive index of said main optical waveguide plate body is n.

3. The optical waveguide plate for said display according to claim 1, wherein said surface-smoothing material is a liquid having good wettability with respect to said main optical waveguide plate body.

4. The optical waveguide plate for said display according to claim 3, further comprising a flat plate fixed on said liquid for constructing said surface-smoothing material.

5. The optical waveguide plate for said display according to claim 4, wherein said flat plate is fixed to said main optical waveguide plate body by using a joining material with said liquid for constructing said surface-smoothing material interposed therebetween.

6. The optical waveguide plate for said display according to claim 1, wherein said surface-smoothing material is a transparent resin layer secured to said main optical waveguide plate body.

7. The optical waveguide plate for said display according to claim 6, further comprising a flat plate fixed on said transparent resin layer for constructing said surface-smoothing material.

8. The optical waveguide plate for said display according to claim 7, wherein said flat plate is fixed to said main optical waveguide plate body by using a joining material with said transparent resin layer for constructing said surface-smoothing material interposed therebetween.

9. A method of enhancing total internal reflection of light in a waveguide plate of a display device, wherein the light is injected into the waveguide plate from at least one side surface thereof, said method comprising:

providing a layer on at least one principal surface of said waveguide plate, said layer comprising a material having an optical refractive index greater than that of said optical waveguide plate;

whereby said layer prevents injected light from being emitted erroneously from said principal surface of said waveguide plate due to defects or irregularities present in or on said principal surface of said waveguide plate.

* * * * *